US012723446B2

(12) United States Patent
Pieri et al.

(10) Patent No.: US 12,723,446 B2
(45) Date of Patent: Sep. 1, 2026

(54) CAR ACCESS ASSEMBLY WITH TWO STRAIN GAUGES ORIENTED DIFFERENTLY

(71) Applicant: MINEBEA ACCESSSOLUTIONS ITALIA S.P.A., Pianezza (IT)

(72) Inventors: Alexandre Pieri, Pianezza (IT); Massimo Frattini, Pianezza (IT); Alberto Gramaglia, Pianezza (IT); Luca Balzarini, Pianezza (IT); Martin Winker, Erdweg (DE); Si Mohammed Arsalane, Erdweg (DE)

(73) Assignee: MINEBEA ACCESSSOLUTIONS ITALIA S.P.A., Pianezza (IT)

(*) Notice: Subject to any disclaimer, the term of this patent is extended or adjusted under 35 U.S.C. 154(b) by 46 days.

(21) Appl. No.: 18/808,867

(22) Filed: Aug. 19, 2024

(65) Prior Publication Data

US 2025/0067092 A1 Feb. 27, 2025

(30) Foreign Application Priority Data

Aug. 22, 2023 (EP) .................................... 23192702

(51) Int. Cl.
*E05B 81/76* (2014.01)
*E05B 85/10* (2014.01)

(52) U.S. Cl.
CPC .............. *E05B 81/76* (2013.01); *E05B 85/10* (2013.01)

(58) Field of Classification Search
CPC .. G01B 21/32; G01B 7/16; G01L 1/22; E05B 81/76; E05B 85/10
See application file for complete search history.

(56) References Cited

U.S. PATENT DOCUMENTS

2003/0101781 A1* 6/2003 Budzynski .............. E05B 85/10 70/239
2014/0292004 A1 10/2014 Ruse
(Continued)

FOREIGN PATENT DOCUMENTS

JP 2008291581 A * 12/2008
JP 2016130392 A 7/2016
(Continued)

OTHER PUBLICATIONS

Espacenet, machine generated translation of JP 2008291581 A (Year: 2025).*
(Continued)

*Primary Examiner* — Kristina R Fulton
*Assistant Examiner* — Emilly G. Brown
(74) *Attorney, Agent, or Firm* — Burris Law, PLLC

(57) ABSTRACT

A car access assembly includes: a support blade extending according to a basis plane; a main strain gauge mounted on the support blade and configured to measure, within the basis plane, an elongation or a contraction of the main strain gauge according to a main direction; an additional strain gauge mounted on the support blade in such a way to extend, at least partially, in an inclined manner with respect to the basis plane; a handle cover presenting a main actuating area configured to be manually actuated according to or parallel to the main direction for triggering the main strain gauge and an additional actuating area configured to be manually actuated according to or parallel to an additional direction, which is transverse to the main direction, for triggering the additional strain gauge.

12 Claims, 3 Drawing Sheets

(56) References Cited

U.S. PATENT DOCUMENTS

| | | | | |
|---|---|---|---|---|
| 2016/0251880 | A1* | 9/2016 | Bingle | E05B 81/76<br>701/49 |
| 2018/0058837 | A1* | 3/2018 | Dektor | H03K 17/9625 |
| 2021/0102415 | A1* | 4/2021 | Scheibe | E05B 81/78 |
| 2023/0090723 | A1* | 3/2023 | Peynot | E05B 85/10<br>292/336.3 |

FOREIGN PATENT DOCUMENTS

| | | | | |
|---|---|---|---|---|
| JP | 6251939 | B2 * | 12/2017 | |
| WO | WO-2024179640 | A1 * | 9/2024 | G07C 9/00174 |

OTHER PUBLICATIONS

Espacenet, machine generated translation of JP 6251939 B2 (Year: 2025).*

European Search Report and Written Opinion issued in corresponding EP Application 23192702.1, dated Feb. 15, 2024, 5 pages.

* cited by examiner

CAR ACCESS ASSEMBLY WITH TWO STRAIN GAUGES ORIENTED DIFFERENTLY

CROSS-REFERENCE TO RELATED APPLICATION

This application claims priority to and the benefit of EP 23192702.1 filed on Aug. 22, 2023, the disclosure of which is incorporated herein by reference in its entirety.

FIELD

The present disclosure relates to a car access assembly with two strain gauges, a main strain gauge and an additional strain gauge, oriented differently, and more particularly to the additional strain gauge that is oriented in an inclined manner with respect to the main strain gauge.

BACKGROUND

The statements in this section merely provide background information related to the present disclosure and may not constitute prior art.

It is known to have different commands built in a car access assembly of a vehicle. Such commands can include release, lock or automatic door opening.

The car access assembly therefore includes different sensors that are linked to a controlling assembly of the vehicle. This provision is satisfactory in that different commands are available to the user in the same location.

However, there is a trend for a clean handle design of the car access assembly. The purpose is to have a sleek designed handle with no apparent element. Such a handle can have a wing form and be painted in glossy black color.

There is another trend to place the car access assembly in the B-pillar or C-pillar area so that the car access assembly becomes hardly visible. The B-pillar or C-pillar area are very compact and reinforced to withstand side crash impacts.

Thus, it is very challenging to integrate a car access assembly in this area of the vehicle door with the required design. Moreover, when integrating several functions in the handle, this becomes even more challenging from both the packaging point of view and the electronic point of view.

The present invention aims to solve all or some of the disadvantages mentioned above.

SUMMARY

This section provides a general summary of the disclosure and is not a comprehensive disclosure of its full scope or all of its features.

For this purpose, the present invention relates to a car access assembly comprising: a support blade extending according to a basis plane, the support blade being configured to be mounted on a structural support of a vehicle door; a main strain gauge mounted on the support blade and configured to measure, within the basis plane, an elongation or a contraction of the main strain gauge according to a main direction; an additional strain gauge mounted on the support blade in such a way to extend, at least partially, in an inclined manner with respect to the basis plane, the additional strain gauge being configured to measure an elongation or a contraction of the additional strain gauge, according to a secondary direction, which is not collinear with the main direction; and a handle cover configured to be mounted around the support blade, the main strain gauge and the additional strain gauge; the handle cover presenting a main actuating area configured to be manually actuated according to or parallel to the main direction for triggering the main strain gauge and an additional actuating area configured to be manually actuated according to or parallel to an additional direction, which is transverse to the main direction, for triggering the additional strain gauge.

This provision enables to easily distinguish different commands of a user that manually actuates the handle cover. Indeed, the respective orientations of the main strain gauge and the additional strain gauge facilitate the interpretation of the measured signals. There is less risk to have measured signals that could lead to a doubt of the actuating area which is really used.

Such a construction allows to downsize the car access assembly and to have the additional strain gauge in proximity from the main strain gauge even though they are measuring different user manual inputs.

According to an aspect of the invention, the handle cover is provided with a main transmission part that is in contact with the support blade in a region of the support blade which is aligned or merged with the main strain gauge location according to the main direction, the main transmission part being configured to apply a strain or load on the support blade in such a way to elongate or contract the main strain gauge according to the main direction when the main actuating area is manually actuated according to or parallel to the main direction.

This provision enables to establish a connection between the manual action of a user on the main actuating area according to the main direction and the triggering of the main stain gauge.

Indeed, as the support blade is mounted on the structural support of the vehicle door, it appears that the support blade is maintained in position by the structural support whereas the handle cover is loaded by the user hand. There is therefore a need for a cooperation between the support blade and the handle cover that facilitates the triggering of the main strain gauge to obtain a reliable command.

According to an aspect of the invention, the main transmission part is a pin extending from the handle cover. Preferably, said pin extends transversally to the basis plane when the handle cover is mounted around the support blade.

The main transmission part can be distant from the main strain gauge according to the main direction. In this case, the main transmission part can cooperate with a face of the support blade on which is located the main strain gauge.

Alternatively, the main transmission part can cooperate with an opposed face of the support blade on the other side of the face on which the main strain gauge is located. In this case, the main transmission part can also be under the main strain gauge.

According to an aspect of the invention, the main strain gauge extends in a planar way in parallel to the basis plane.

According to an aspect of the invention, the handle cover is provided with an additional transmission part that is in contact with the support blade in a region of the support blade which is aligned or merged with the additional strain gauge location according to the additional direction, the additional transmission part being configured to apply a strain on the support blade in such a way to elongate or contract the additional strain gauge when the additional actuating area is manually actuated according to or parallel to the additional direction.

This provision enables to link the manual action of a user on the additional actuating area according to the additional direction to the triggering of the additional stain gauge.

According to an aspect of the invention, the additional transmission part is a pin extending from the handle cover.

The additional transmission part can cooperate with the opposed face of the support blade which is on the other side of the face on which the additional strain gauge is located. In this case, the additional transmission part can also be under the additional strain gauge.

Alternatively, the additional transmission part can be distant from the additional strain gauge according to the additional direction. In this case, the additional transmission part can cooperate with the face of the support blade on which is located the additional strain gauge.

According to an aspect of the invention, the handle cover comprises an upper cover and a lower cover configured to cooperate, for example by including each a corresponding part of a snap-in mechanism.

Preferably, the upper cover includes the main transmission part and the lower cover includes the additional transmission part.

According to an aspect of the invention, the additional strain gauge extends at least partially in a curved way.

This provision enables to trigger the additional strain gauge not only according to the additional direction but also according to other directions that are tangential to the curvature of the additional strain gauge.

The perceived signal according to these other directions is more or less important depending on the curvature of the additional strain gauge.

The combined effect of the main strain gauge and the additional strain gauge is to capture three dimensional efforts and to eventually filter out what could be a misuse case or a solicitation coming from an undesired direction not associated with the principal function.

Indeed, it becomes apparent if only the main strain gauge or only the additional strain gauge is triggered or both at same time. The strength of the signal engendered by the additional strain gauge also tells according to which direction the actuation comes.

A strong or relevant signal is received for an actuation according to the additional direction whereas the additional strain gauge can be curved in such a way as to receive weaker signals from the other directions.

In case a misuse is detected, because both the main strain gauge and the additional strain gauge are actuated together, the signals can be considered as unintentional.

Conversely, the additional strain gauge can extend in a planar way and be triggered only according to the additional direction. This alternative construction is simple and the advantage of having the additional strain gauge in proximity to the main strain gauge still applies.

According to an aspect of the invention, the additional strain gauge comprises a portion extending according to the basis plane.

This provision allows to detect, in addition to the signal from the main strain gauge, an effort applied by the user according to a direction within the basis plane.

Typically, this could be helpful to distinguish between a user applying an effort on the main actuating area according to the main direction and a user gripping the handle or using the handle as a hook for a bag.

Combining the signals from the main strain gauge and from the additional strain gauge helps determining more precisely the user command.

According to an aspect of the invention, the portion of the additional strain gauge extending according to the basis plane is parallel to the main direction.

Thus, said portion is oriented to detect within the basis plane an elongation or contraction parallel to the main direction.

As an example, this provision is helpful to detect if a user is really trying to actuate the main actuating area. If the signal received by the main strain gauge and the signal received by the additional strain gauge both correspond to an elongation and if the signal from the main strain gauge is more relevant or stronger, it could lead to the conclusion that the command is correct.

Conversely, if the additional strain gauge signal is more relevant or stronger, it possibly means that there is a misuse and that the handle cover is actuated in areas that are not appropriate.

Naturally, depending on the geometry of the car access assembly, the positions and sensitivities of the sensors, other interpretation of both signals could be done.

According to an aspect of the invention, the support blade includes an additional extension fraction which extends, at least partially, in an inclined manner with respect to the basis plane; the additional strain gauge being at least partially mounted on said additional extension fraction.

The at least partial inclined extension of the additional strain gauge is defined by the geometry of the additional extension fraction with respect to the basis plane.

In other words, the support blade mainly extends according to the basis plane but also has an additional extension fraction which is oriented differently. This provision enables to easily mount the additional strain gauge on the support blade with the right orientation.

According to an aspect of the invention, the car access assembly includes a flexible circuit board configured to be installed on the support blade and to receive the main strain gauge and the additional strain gauge.

In other words, the flexible circuit board is placed between the support blade on one side and the main strain gauge and additional strain gauge on the other side. This construction simplifies the electrical connection of the main strain gauge and the additional strain gauge to track the signals.

According to an aspect of the invention, the flexible circuit board comprises a connection section configured to be connected to a controlling assembly of the vehicle.

Preferably, the support blade presents a through opening for the passage of the connection section. In particular, the controlling assembly of the vehicle is mounted on the structural support.

According to an aspect of the invention, the car access assembly is provided with a fixation mechanism for being mounted on a corresponding arrangement of the structural support. For example, said fixation mechanism comprises screws and guiding openings for the screws within the support blade.

According to an aspect of the invention, the support blade includes a main extension fraction which extends, at least partially, in an inclined manner with respect to the basis plane; the main strain gauge being aligned with said main extension fraction according to the main direction.

This geometrical construction reinforces the structure of the support blade and could also serve as a basis element for including other parts within the handle cover. Also, this part can cooperate with the handle cover to transmit the effort of the user by contact with the main actuating area.

According to an aspect of the invention, the handle cover comprises: a basis fraction extending according to the basis plane and encompassing at least partially the support blade; and an actuating fraction linked to the basis fraction and extending transversally to the basis fraction, the actuating fraction including the main actuating area and the additional actuating area so as to be capable of being actuated according to or parallel to the main direction and the additional direction.

This provision defines the form of the handle. It appears that the orientation of the actuating fraction enables to more easily transmit the commands to the main strain gauge and the additional strain gauge.

According to an aspect of the invention, the actuating fraction presents a main edge extending parallel to the basis plane and transversally to the main direction so as to define the main actuating area; and wherein the actuation fraction presents an additional edge extending transversally to the main edge and oriented toward the basis fraction so as to define the additional actuating area.

The handle cover presents a wing form, the transversal part defined by the additional edge being operable as the additional actuating area and the straight part defined by the main edge as the main actuating area.

According to an aspect of the invention, the actuating fraction starting from the main edge is manually operable by a user in parallel to the main direction. Preferably, from the user perspective, a first function is associated when pushing and a second function is associated when pulling.

According to an aspect of the invention, the actuating fraction starting from the additional edge is manually operable by a user transversally to the direction of the additional edge. The user can tap or press the additional edge to actuate a third function. Said direction extending transversally to the additional edge corresponds to the additional direction.

The first function can be an automatic opening command of the vehicle door. The second function can be the opening of the vehicle door so that the user can pull the car door by hand. The third function can be locking and unlocking the vehicle.

The functions can also be reprogrammed by the user thanks to the controlling assembly of the vehicle.

According to an aspect of the invention, the actuating fraction can include an optional sensing unit configured to be linked to a dedicated part of the flexible circuit board.

The optional sensing unit is then used as redundant sensor(s) to improve the filtering of the signals. The optional sensing unit can include for example a capacitive sensor.

The optional sensing unit can also include a led module, an NFC approach sensor and/or a light guide or courtesy light.

According to an aspect of the invention, the car access assembly comprises a resin configured to fill the gaps between the handle cover and the rest of the inner elements of the car access assembly. This works like a protection glove that renders the car access assembly tight and waterproof.

The present invention also concerns a vehicle door comprising the structural support and the car access assembly as described above, the support blade being mounted on the structural support of the vehicle door, said structural support being part of or being mounted on a pillar of the vehicle door.

As the main strain gauge and the additional strain gauge can be placed in proximity from each other within the handle cover, there is no difficulty to install the car access assembly on the vehicle pillar. In particular, said pillar corresponds to B-pillar or C-pillar.

The invention also concerns a vehicle comprising at least one vehicle door as described above.

The different aspects defined above that are not incompatible can be combined.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
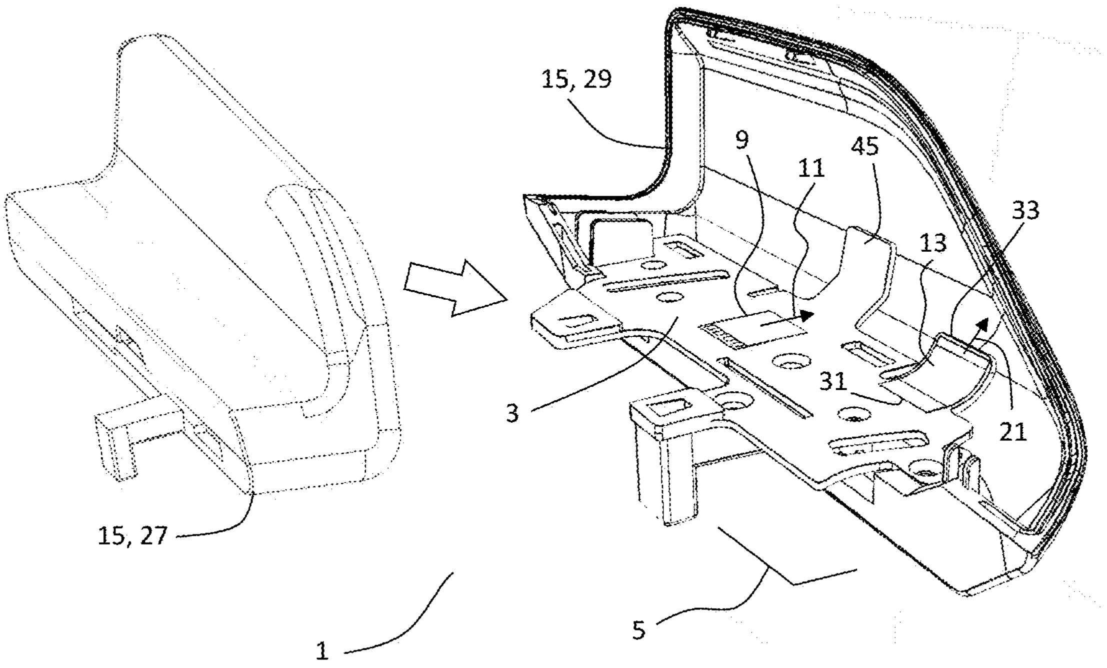
FIG. 1 is a perspective exploded view of a car access assembly.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description of the figures defined above, the same elements or the elements that are fulfilling identical functions may retain the same references so as to simplify the understanding of the invention.

As illustrated in FIGS. 1 to 6, a car access assembly 1 comprises a support blade 3 extending according to a basis plane 5, the support blade 3 being configured to be mounted on a structural support 7 of a vehicle door.

The car access assembly 1 comprises a main strain gauge 9 mounted on the support blade 3 and configured to measure, within the basis plane 5, an elongation or a contraction of the main strain gauge 9 according to a main direction 11.

The car access assembly 1 comprises an additional strain gauge 13 mounted on the support blade 3 in such a way to extend, at least partially, in an inclined manner with respect to the basis plane 5. The additional strain gauge 13 is configured to measure an elongation or a contraction of the additional strain gauge 13.

The car access assembly 1 comprises a handle cover 15 configured to be mounted around the support blade 3, the main strain gauge 9 and the additional strain gauge 13.

Figure 2:
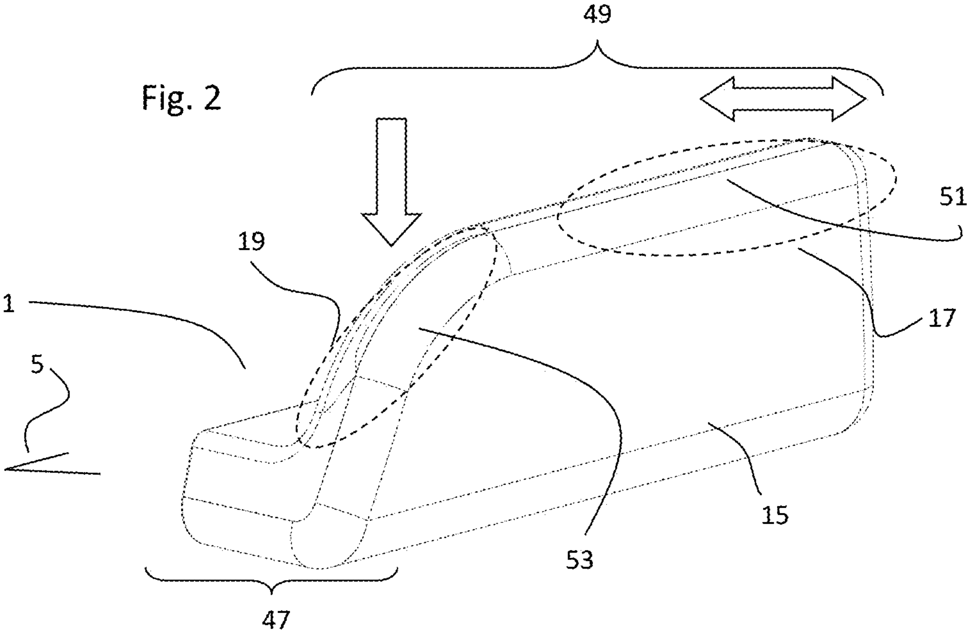
FIG. 2 is a perspective view of the car access assembly.

As illustrated on FIGS. 1 and 2, the handle cover 15 presents a main actuating area 17 configured to be manually actuated according to or parallel to the main direction 11 for triggering the main strain gauge 9 and an additional actuating area 19 configured to be manually actuated according to or parallel to an additional direction 21, which is transverse to the main direction 11, for triggering the additional strain gauge 13.

Figure 3:
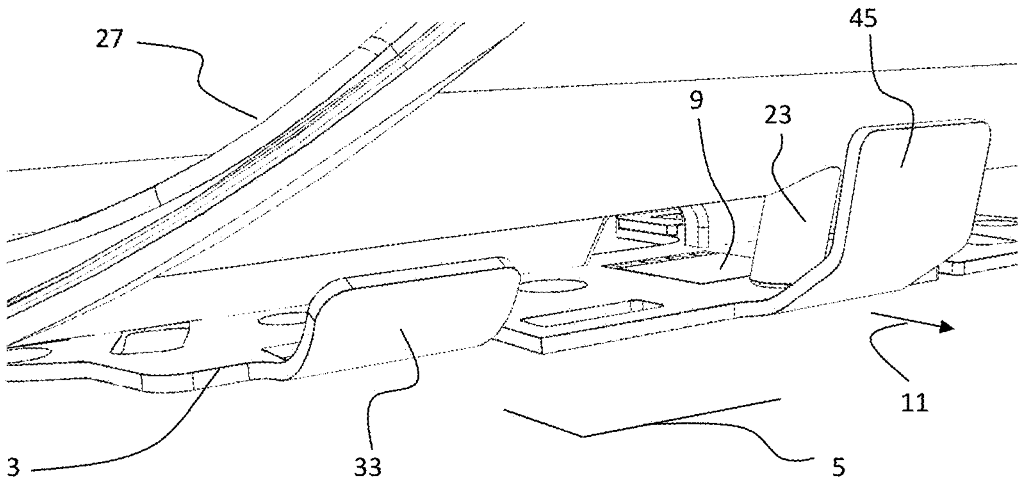
FIG. 3 is a perspective view of a detail of the car access assembly including a support plate.

As illustrated in FIG. 3, the handle cover 15 is provided with a main transmission part 23 that is in contact with the support blade 3 in a region of the support blade 3 which is aligned or merged with the main strain gauge 9 location according to the main direction 11.

The main transmission part 23 is configured to apply a strain on the support blade 3 in such a way to elongate or contract the main strain gauge 9 according to the main direction 11 when the main actuating area 17 is manually actuated according to or parallel to the main direction 11.

This establishes a connection between the manual action of a user on the main actuating area 17 according to the main direction 11 and the triggering of the main stain gauge 9.

Indeed, as the support blade 3 is mounted on the structural support 7 of the vehicle door, it appears that the support blade 3 is maintained in position by the structural support 7 whereas the handle cover 15 is loaded by the user hand. There is therefore a need for a cooperation between the support blade 3 and the handle cover 15 that facilitates the triggering of the main strain gauge 9 to obtain a reliable command.

The main transmission part 23 is a pin extending from the handle cover 15. Said pin extends transversally to the basis plane 5 when the handle cover 15 is mounted around the support blade 3.

The main transmission part 23 is here distant from the main strain gauge 9 according to the main direction 11. In this case, the main transmission part 23 cooperates with a face of the support blade 3 on which is located the main strain gauge 9.

The main strain gauge 9 extends in a planar way in parallel to the basis plane 5.

Figure 4:
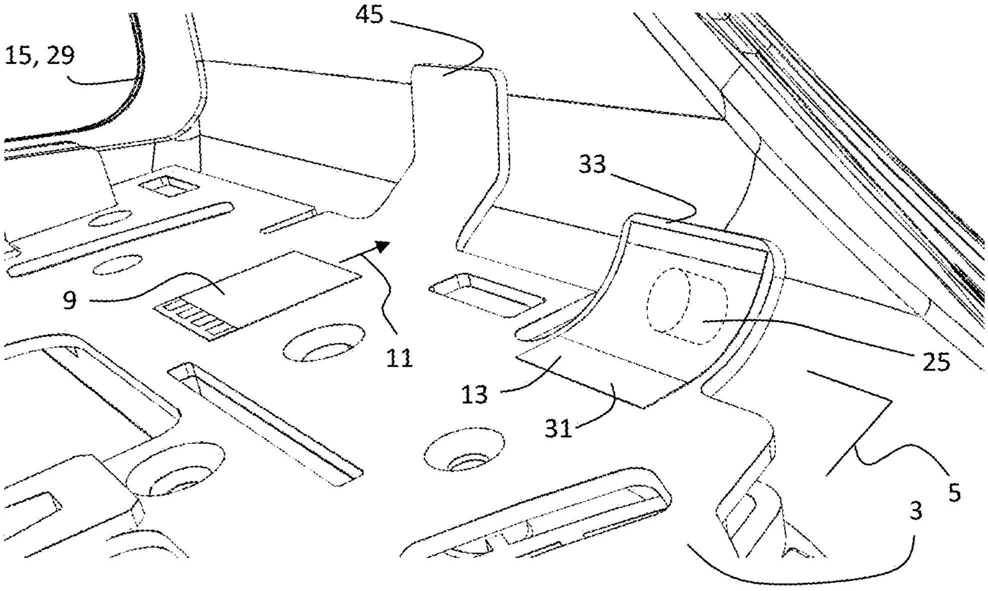
FIG. 4 is a perspective view of another detail of the car access assembly.

As illustrated in FIG. 4, the handle cover 15 is provided with an additional transmission part 25 that is in contact with the support blade 3 in a region of the support blade 3 which is aligned or merged with the additional strain gauge 13 location according to the additional direction 21.

The additional transmission part 25 is configured to apply a strain on the support blade 3 in such a way to elongate or contract the additional strain gauge 13 when the additional actuating area 19 is manually actuated according to or parallel to the additional direction 21.

This links the manual action of a user on the additional actuating area 19 according to the additional direction 21 to the triggering of the additional stain gauge 13.

The additional transmission part 25 is a pin extending from the handle cover 15.

The additional transmission part 25 cooperates with an opposed face of the support blade 3 which is on the other side of the face on which the additional strain gauge 13 is located. In this case, the additional transmission part 25 is under the additional strain gauge 13.

As illustrated in FIG. 1, the handle cover 15 comprises an upper cover 27 and a lower cover 29 configured to cooperate, for example by including each a corresponding part of a snap-in mechanism. The upper cover 27 includes the main transmission part 23 and the lower cover 29 includes the additional transmission part 25.

The additional strain gauge 13 extends at least partially in a curved way. This enables to trigger the additional strain gauge 13 not only according to the additional direction 21 but also according to other directions that are tangential to the curvature of the additional strain gauge 13.

The perceived signal according to these other directions is more or less important depending on the curvature of the additional strain gauge 13.

The combined effect of the main strain gauge 9 and the additional strain gauge 13 is to capture three dimensional efforts and to eventually filter out what could be a misuse case or a solicitation coming from an undesired direction not associated with the principal function.

Indeed, it becomes apparent if only the main strain gauge 9 or only the additional strain gauge 13 is triggered or both at same time. The strength of the signal engendered by the additional strain gauge 13 also tells according to which direction the actuation comes.

A strong or relevant signal is received for an actuation according to the additional direction 21 whereas the additional strain gauge 13 can be curved in such a way as to receive weaker signals for the other directions.

In case a misuse is detected, because both the main strain gauge 9 and the additional strain gauge 13 are actuated together, the signals can be considered as unintentional.

The additional strain gauge 13 comprises a portion 31 extending according to the basis plane 5. It allows to detect, in addition to the signal from the main strain gauge 9, an effort applied by the user according to a direction within the basis plane 5.

Typically, this could be helpful to distinguish between a user applying an effort on the main actuating area 17 according to the main direction 11 and a user gripping the handle or using the handle as a hook for a bag.

Combining the signals from the main strain gauge 9 and from the additional strain gauge 13 helps determining more precisely the user command.

The portion 31 of the additional strain gauge 13 extending according to the basis plane 5 is parallel to the main direction 11.

Thus, said portion 31 is oriented to detect within the basis plane 5 an elongation or contraction parallel to the main direction 11.

As an example, this provision is helpful to detect if a user is really trying to actuate the main actuating area 17. If the signal received by the main strain gauge 9 and the signal received by the additional strain gauge 13 both correspond to an elongation and if the signal from the main strain gauge 9 is more relevant or stronger, it could lead to the conclusion that the command is correct.

Conversely, if the additional strain gauge 13 signal is more relevant or stronger, it possibly means that there is a misuse and that the handle cover is actuated in areas that are not appropriate.

Naturally, depending on the geometry of the car access assembly 1, the positions and sensitivities of the sensors, other interpretation of both signals could be done.

The support blade 3 includes an additional extension fraction 33 which extends, at least partially, in an inclined manner with respect to the basis plane 5; the additional strain gauge 13 being at least partially mounted on said additional extension fraction 33.

The at least partial inclined extension of the additional strain gauge 13 is defined by the geometry of the additional extension fraction 33 with respect to the basis plane 5.

In other words, the support blade 3 mainly extends according to the basis plane 5 but also has an additional extension fraction 33 which is oriented differently. This provision enables to easily mount the additional strain gauge 13 on the support blade 3 with the right orientation.

Figure 5:
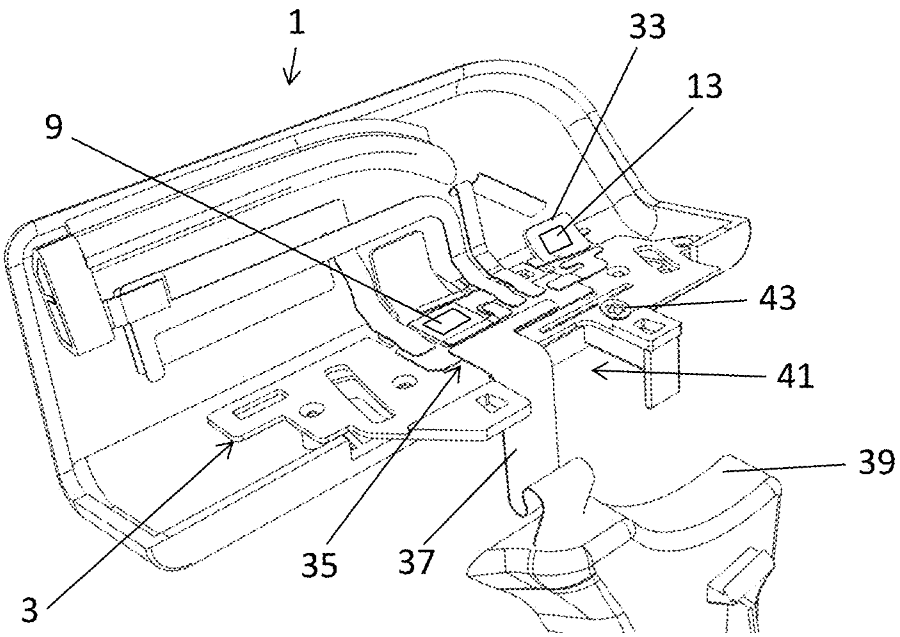
FIG. 5 is a perspective view of the support plate on which are mounted a flexible circuit board and two strain gauges.
Figure 6:
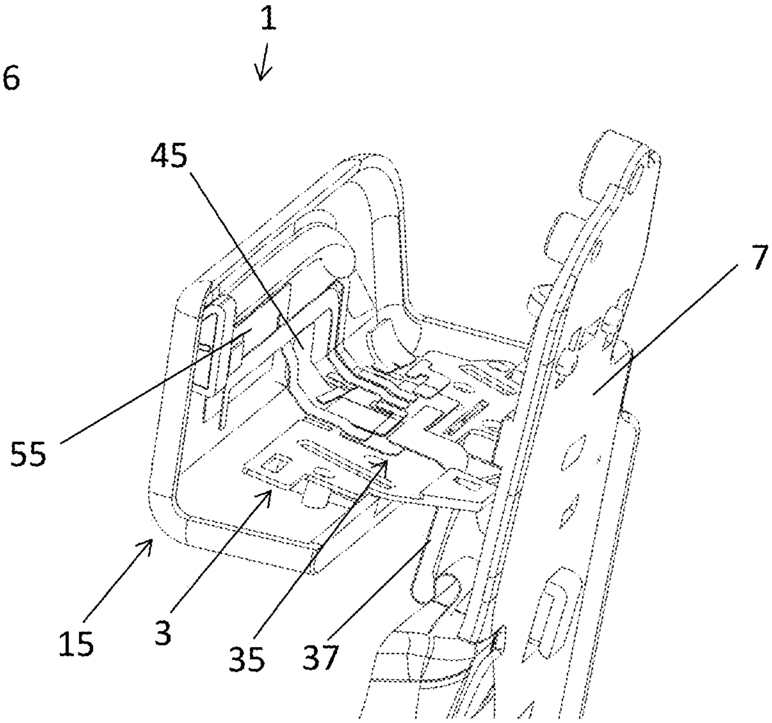
FIG. 6 is a perspective view of the support plate and a structural support of the vehicle.

As illustrated in FIGS. 5 and 6, the car access assembly 1 includes a flexible circuit board 35 configured to be installed on the support blade 3 and to receive the main strain gauge 9 and the additional strain gauge 13.

In other words, the flexible circuit board 35 is placed between the support blade 3 on one side and the main strain gauge 9 and additional strain gauge 13 on the other side.

The flexible circuit board 35 comprises a connection section 37 configured to be connected to a controlling assembly 39 of the vehicle.

The support blade 3 presents a through opening 41 for the passage of the connection section 37. The controlling assembly 39 of the vehicle is mounted on the structural support 7.

The car access assembly 37 is provided with a fixation mechanism 43 for being mounted on a corresponding arrangement of the structural support 7. For example, said fixation mechanism 43 comprises screws and guiding openings for the screws within the support blade 3.

The support blade 3 includes a main extension fraction 45 which extends, at least partially, in an inclined manner with respect to the basis plane 5; the main strain gauge 9 being aligned with said main extension fraction 45 according to the main direction 11.

As illustrated in FIG. 2, functionally, the handle cover 15 comprises a basis fraction 47 extending according to the basis plane 5 and encompassing at least partially the support blade 3.

The handle cover 15 also comprises an actuating fraction 49 linked to the basis fraction 47 and extending transversally to the basis fraction 47, the actuating fraction 49 including the main actuating area 17 and the additional actuating area 19 so as to be capable of being actuated according to or parallel to the main direction 11 and the additional direction 21.

The actuating fraction 49 presents a main edge 51 extending parallel to the basis plane 5 and transversally to the main direction 11 so as to define the main actuating area 17.

The actuation fraction 49 also presents an additional edge 53 extending transversally to the main edge 51 and oriented toward the basis fraction 47 so as to define the additional actuating area 19.

The handle cover 15 presents a wing form, the transversal part defined by the additional edge 53 being and the straight part defined by the main edge 51.

The actuating fraction 49 starting from the main edge 51 is manually operable by a user in parallel to the main direction 11. From the user perspective, a first function is associated when pushing and a second function is associated when pulling.

The actuating fraction 49 starting from the additional edge 53 is manually operable by a user transversally to the direction of the additional edge 53. The user can tap or press the additional edge 53 to actuate a third function. Said direction extending transversally to the additional edge 53 corresponds to the additional direction 21.

The first function can be an automatic opening command of the vehicle door. The second function can be the opening of the vehicle door so that the user can pull the car door by hand. The third function can be locking and unlocking the vehicle.

The functions can also be reprogrammed by the user thanks to the controlling assembly 39 of the vehicle.

As illustrated in FIGS. 5 and 6, the actuating fraction 49 can include an optional sensing unit 55 configured to be linked to a dedicated part of the flexible circuit board 35.

The optional sensing unit 55 is then used as redundant sensor(s) to improve the filtering of the signals. The optional sensing unit 55 can include for example a capacitive sensor.

The optional sensing unit 55 can also include a led module, a NFC approach sensor and/or a light guide or courtesy light.

The car access assembly 1 comprises a resin configured to fill the gaps between the handle cover and the rest of the inner elements of the car access assembly 1. This works like a protection glove that renders the car access assembly 1 tight and resistant.

The obtained vehicle door comprises the structural support 7 and the car access assembly 1 as described, the support blade 3 being mounted on the structural support 7 of the vehicle door, said structural support 7 being part of or being mounted on a pillar of the vehicle door.

As the main strain gauge 9 and the additional strain gauge 13 can be placed in proximity from each other within the handle cover 15, there is no difficulty to install the car access assembly 1 on the vehicle pillar. In particular, said pillar corresponds to B-pillar or C-pillar.

A vehicle can then comprise several vehicle doors as described above.

The described vehicle handles have different commands integrated in a small place and can have a clean design. Indeed, the respective orientations of the main strain gauge 9 and the additional strain gauge 13 facilitate the interpretation of the measured signals. There is less risk to have measured signals that could lead to a doubt of the actuating area which is really used.

As goes without saying, the invention is not limited to the sole embodiment described above by way of example, it encompasses all the variants.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A car access assembly, comprising:

a support blade extending according to a basis plane and configured to be mounted on a structural support of a vehicle door;

a main strain gauge mounted on the support blade and configured to measure, within the basis plane, an elongation or a contraction of the main strain gauge according to a main direction;

an additional strain gauge mounted on the support blade in such a way to extend, at least partially, in an inclined manner with respect to the basis plane, the additional strain gauge being configured to measure an elongation or a contraction of the additional strain gauge; and a handle cover configured to be mounted around the support blade, the main strain gauge and the additional strain gauge; the handle cover presenting a main actuating area configured to be manually actuated according to or parallel to the main direction for triggering the main strain gauge and an additional actuating area configured to be manually actuated according to or parallel to an additional direction, which is transverse to the main direction, for triggering the additional strain gauge;

wherein the handle cover comprises:

a basis fraction extending according to the basis plane and encompassing at least partially the support blade; and an actuating fraction linked to the basis fraction and extending transversally to the basis fraction, the actuating fraction including the main actuating area and the additional actuating area so as to be capable of being actuated according to or parallel to the main direction and the additional direction.

2. The car access assembly according to claim 1, wherein the handle cover is provided with a main transmission part that is in contact with the support blade in a region of the support blade which is aligned or merged with a location of the main strain gauge according to the main direction, the main transmission part being configured to apply a strain on the support blade in such a way to elongate or contract the main strain gauge according to the main direction when the main actuating area is manually actuated according to or parallel to the main direction.

3. The car access assembly according to claim 1, wherein the main strain gauge extends in a planar way in parallel to the basis plane.

4. The car access assembly according to claim 1, wherein the handle cover is provided with an additional transmission part that is in contact with the support blade in a region of the support blade which is aligned or merged with a location of the additional strain gauge according to the additional direction, the additional transmission part being configured to apply a strain on the support blade in such a way to elongate or contract the additional strain gauge when the additional actuating area is manually actuated according to or parallel to the additional direction.

5. The car access assembly according to claim 1, wherein the additional strain gauge extends at least partially in a curved way.

6. The car access assembly according to claim 5, wherein the additional strain gauge comprises a portion extending according to the basis plane.

7. The car access assembly according to claim 6, wherein the portion of the additional strain gauge extending according to the basis plane is parallel to the main direction.

8. The car access assembly according to claim 1, wherein the support blade includes an additional extension fraction which extends, at least partially, in an inclined manner with respect to the basis plane; the additional strain gauge being at least partially mounted on said additional extension fraction.

9. The car access assembly according to claim 1, further comprising a flexible circuit board configured to be installed on the support blade and to receive the main strain gauge and the additional strain gauge.

10. The car access assembly according to claim 1, wherein the support blade includes a main extension fraction which extends, at least partially, in an inclined manner with respect to the basis plane; the main strain gauge being aligned with said main extension fraction according to the main direction.

11. The car access assembly according to claim 1, wherein the actuating fraction presents a main edge extending parallel to the basis plane and transversally to the main direction so as to define the main actuating area; and wherein the actuation fraction presents an additional edge extending transversally to the main edge and oriented toward the basis fraction so as to define the additional actuating area.

12. A vehicle door comprising the structural support and the car access assembly according to claim 1, wherein the support blade is mounted on the structural support of the vehicle door, said structural support being part of or being mounted on a pillar of the vehicle door.

* * * * *